(12) United States Patent
Fujiwara et al.

(10) Patent No.: US 11,016,559 B2
(45) Date of Patent: May 25, 2021

(54) DISPLAY SYSTEM AND DISPLAY CONTROL METHOD OF DISPLAY SYSTEM

(71) Applicant: Hitachi-LG Data Storage, Inc., Tokyo (JP)

(72) Inventors: Takayuki Fujiwara, Tokyo (JP); Yoshihiro Machida, Tokyo (JP); Yoshiho Seo, Tokyo (JP); Tatsuya Ishitobi, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 16/029,889

(22) Filed: Jul. 9, 2018

(65) Prior Publication Data

US 2019/0018477 A1 Jan. 17, 2019

(30) Foreign Application Priority Data

Jul. 11, 2017 (JP) .............................. JP2017-135288

(51) Int. Cl.
*G06F 3/01* (2006.01)
*G06F 3/0346* (2013.01)
(Continued)

(52) U.S. Cl.
CPC ............ *G06F 3/012* (2013.01); *G06F 3/0346* (2013.01); *G06F 3/0484* (2013.01); *G09G 3/002* (2013.01);
(Continued)

(58) Field of Classification Search
CPC ........ G06F 3/013; G06F 3/0346; G06F 3/012; G06F 3/0484; G06F 2203/04806;
(Continued)

(56) References Cited

U.S. PATENT DOCUMENTS

2011/0190052 A1 8/2011 Takeda et al.
2011/0190061 A1 8/2011 Takeda et al.
(Continued)

FOREIGN PATENT DOCUMENTS

CN 106066537 A 11/2016
JP 2012-161604 A 8/2012
(Continued)

OTHER PUBLICATIONS

Chinese Office Action received in corresponding Chinese Application No. 201810732796.8 dated Jun. 1, 2020.
(Continued)

*Primary Examiner* — Roberto W Flores
(74) *Attorney, Agent, or Firm* — Mattingly & Malur, PC

(57) ABSTRACT

A terminal display device which a user wears on a user's head displays on a display unit an information object to be overlapped with a field of view of the user, detects a motion of the terminal display device, and stores a pattern of a motion of the terminal display device and an operation content of the information object that is displayed in association with each other. An information type management memory unit stores information related to a display mode of each of the information objects. A display control unit determines an operation content of the terminal display device based on the motion that is detected and an association between the motion pattern and the operation content, specifies the information object disposed at a predetermined position of the display unit, and performs an operation specified with the determined operation content on the specified information object.

15 Claims, 13 Drawing Sheets

(51) Int. Cl.
  *G09G 3/00* (2006.01)
  *G06F 3/0484* (2013.01)
  *G09G 5/391* (2006.01)
(52) U.S. Cl.
  CPC ... *G06F 2203/04806* (2013.01); *G09G 5/391* (2013.01); *G09G 2340/0407* (2013.01); *G09G 2354/00* (2013.01)
(58) Field of Classification Search
  CPC ..... G06F 3/011; G06F 3/04815; G09G 3/002; G09G 2340/0407; G09G 2354/00; G09G 5/391; A63F 13/211; A63F 13/26; A63F 13/5255; A63F 13/92; A63F 2300/6676; A63F 2300/105; A63F 2300/403; A63F 2300/301; H04N 21/42202; H04N 21/4781; H04N 21/4854
  See application file for complete search history.

(56) References Cited

U.S. PATENT DOCUMENTS

| | | |
|---|---|---|
| 2011/0285704 A1 | 11/2011 | Takeda et al. |
| 2012/0235902 A1 | 9/2012 | Eisenhardt et al. |
| 2015/0261291 A1* | 9/2015 | Mikhailov .............. G06T 7/251 345/156 |
| 2016/0187969 A1* | 6/2016 | Larsen .................... G06F 3/012 345/156 |
| 2018/0113507 A1* | 4/2018 | Abdollahi .............. A42B 3/042 |
| 2019/0004316 A1* | 1/2019 | Baek ...................... G02B 27/01 |

FOREIGN PATENT DOCUMENTS

| | | |
|---|---|---|
| JP | 2013-254251 A | 12/2013 |
| JP | 2017-10120 A | 1/2017 |
| JP | 2017-21461 A | 1/2017 |
| JP | 2017-45296 A | 3/2017 |
| WO | 2017/022872 A1 | 2/2017 |

OTHER PUBLICATIONS

Japanese Office Action received in corresponding Japanese Application No. 2017-135288 dated Nov. 17, 2020.

* cited by examiner

DATA PROCESSING FLOW EXAMPLE OF HMD 10

FIG. 6
EXEMPLARY CONFIGURATION OF MOTION DETERMINATION DATABASE 1171

| | LARGE | | SMALL | |
|---|---|---|---|---|
| | SPEED | | | |
| | FAST | SLOW | FAST | SLOW |
| FORWARD INCLINING | A | B | C | D |
| BACKWARD INCLINING | E | F | G | H |
| LEFT TURNING | I | J | K | L |
| RIGHT TURNING | M | N | O | P |
| LEFT INCLINING | Q | R | S | T |
| RIGHT INCLINING | U | V | W | X |
| GOING FORWARD | Y | Z | Aa | Bb |
| GOING BACKWARD | Cc | Dd | Ee | Ff |
| STOPPING | Gg | | | |

FIG. 7

EXEMPLARY CONFIGURATION OF
OPERATION CORRESPONDENCE DATABASE 1173

| DETECTION MOTION | OPERATION CONTENT |
|---|---|
| C. Gg | MAGNIFY INFORMATION |
| A. Gg | RETURN TO MENU |
| K. Gg | SELECT LEFT OBJECT |
| W. Gg | SELECT RIGHT OBJECT |
| E. Gg, E, E, Gg, E | UNDO |
| ... | ... |

FIG. 8

EXEMPLARY CONFIGURATION OF
INFORMATION TYPE MANAGEMENT DATABASE 1172

| NO. | INFORMATION OBJECT NAME | TYPE TAG | ACTUAL DATA NAME | FILE NAME OF DISPLAY ICON | DISPLAY MODE AT LONG DISTANCE | DISPLAY MODE AT CLOSE DISTANCE |
|---|---|---|---|---|---|---|
| 1 | 2017_INSPECTION MANUAL | DOCUMENT | 2017_INSPECTION MANUAL.pdf | Document.jpg | ICON | ACTUAL DATA |
| ... | ... | ... | ... | ... | ... | ... |
| 11 | 20170220_DEVICE A PANEL INSPECTION END PICTURE | PICTURE | 20170220_DEVICE A PANEL INSPECTION END PICTURE.jpg | Picture.jpg | ICON | ACTUAL DATA |
| ... | ... | ... | ... | ... | ... | ... |
| 21 | 20170225_DEVICE B MOTION VIDEO | MOVING IMAGE | 20170225_DEVICE B MOTION VIDEO.mp4 | Movie.jpg | ICON | ACTUAL DATA |
| ... | ... | ... | ... | ... | ... | ... |
| 31 | 20170227_MANAGER NOTIFICATION | MAIL | 20170227_MANAGER NOTIFICATION.msg | Mail.jpg | ACTUAL DATA (RESOLUTION: 320*240) | ACTUAL DATA (RESOLUTION: 800*600) |

DATA PROCESSING FLOW EXAMPLE OF THIRD EMBODIMENT

DISPLAY SYSTEM AND DISPLAY CONTROL METHOD OF DISPLAY SYSTEM

CROSS-REFERENCE TO RELATED APPLICATION

This application claims priority pursuant to 35 U.S.C. § 119 from Japanese Patent Application No. 2017-135288, filed on Jul. 11, 2017, the entire disclosure of which is incorporated herein by reference.

BACKGROUND

The present invention relates to a display system and a display control method of the display system.

In recent years, a head mount display (HMD) has been developed as a terminal display device which is being mounted on a user's head such as glasses, and various applications for industries and for general purpose are being studied.

The HMD may be used as an augmented reality (AR) which is capable of providing visual information overlapped with information of a virtual space established by computer graphics (CG) in a real world, and as a device which is used to realize a function of a virtual reality (VR) where a user can get a visual experience generated by the CG which is totally different from the real world.

For example, in industrial fields, there is an attempt to enable issuing a work instruction intuitively by using the AR in various works at distribution sites and manufacturing sites, and maintenance of devices, thereby increase the work efficiency. However, information visibility is a critical problem because a viewable range (that is, a visibility angle) of the CG information becomes narrow when the user wears the HMD. In addition, when the HMD is used in an industrial field, there is a need to control the CG information in the HMD in a state where the user holds nothing in hand when wearing the HMD (that is, in a hands-free condition) in order to improve the work efficiency. However, it is not practical using a mechanism which can operate the HMD in a handsfree manner instead of a manual input device such as a mouse and a keyboard.

As an attempt to simulate a wide visibility angle, there is proposed a mechanism which changes display information according to an orientation of the terminal display device by utilizing an acceleration sensor, a gyro sensor, and a magnetic sensor which are provided in the terminal display device. For example, JP-A-2012-161604 discloses a multi-display human machine interface. In JP-A-2012-161604, a movable window can provide an observation window from a viewpoint of one person from the virtual space. A view from the observation window is changed based on an orientation of spatiality of the movable window with respect to a still window in a multidimensional space. The display can propose an image of the virtual space, and an additional movable display can also propose an additional image of the same virtual space.

SUMMARY

In JP-A-2012-161604, part of the virtual space can be recognized when the user putting on the HMD views surroundings. However, there is no disclosure about an operating method for controlling display information in a handsfree manner when the virtual space is displayed using the HMD.

According to an aspect of the invention to solve the above and other problems, there is provided a display system. The display system includes a terminal display device which a user wears on a user's head. The terminal display device includes a display unit which displays an information object to be overlapped with a field of view of the user, a motion detection unit which detects a motion of the terminal display device, a motion pattern memory unit which stores a pattern of a motion of the terminal display device and operation content of the information object displayed in the display unit in association with each other, an information type management memory unit which stores information related to a display mode of each of the information objects, a motion determination unit which determines an operation content of the terminal display device based on the motion of the terminal display device detected by the motion detection unit and an association between the motion pattern stored in the motion pattern memory unit and the operation content, an information type determination unit which specifies the information object disposed at a predetermined position of the display unit, and a display processing unit which performs an operation specified with the determined operation content on the specified information object.

According to an aspect of the invention, it is possible to control display information in a virtual space which is provided by a terminal display device according to a motion of the terminal display device which a user wears on a user's head.

BRIEF DESCRIPTION OF THE DRAWINGS

FIG. 6 is a diagram illustrating an exemplary configuration of a motion determination database;

FIG. 7 is a diagram illustrating an exemplary configuration of an operation correspondence database;

FIG. 8 is a diagram illustrating an exemplary configuration of an information type management database;

DESCRIPTION OF THE EMBODIMENTS

Figure 1:
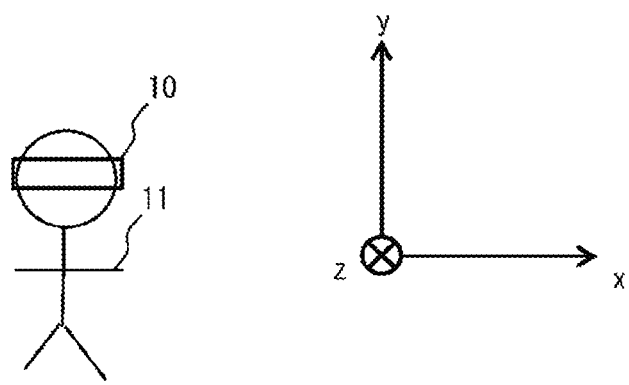
FIG. 1 is a diagram schematically illustrating an example of a use state of a terminal display device according to a first embodiment of the invention.

Hereinafter, embodiments of the invention will be described using the drawings. Further, the same symbols in the drawings represent the same or corresponding portions. In addition, the invention is not limited to the exemplary configurations of the drawings.

First Embodiment

A head-mount terminal display device according to a first embodiment of the invention will be described with reference to FIGS. 1 to 7. FIG. 1 is a diagram schematically illustrating a use state of a head-mounting terminal display device 10. Further, for the simplicity, in the following specification, a head-mounting terminal display device which is a device to provide an image or a video display function to a person who puts the device on the head is called an HMD. The HMD includes various shapes of devices such as a device of a normal glasses shape to correct eyesight, a device of a goggle shape which covers around the eyes, or a device which covers the entire head like a helmet.

In an HMD 10 of a display system of the embodiment, information displayed by utilizing various types of sensors can be operated. As illustrated in FIG. 1, the HMD 10 of the embodiment is a terminal device which is formed in a goggle shape which a user 11 puts on his/her head. The HMD 10 can control display information while realizing a perfect handsfree operation without operating a certain type of device with hands, and without generating a sensor signal by gestures. Since the display information can be controlled in a handsfree manner, an operator who puts on the HMD 10 does not need to hold and operate a device to control the display information with hands. Therefore, with the HMD 10, work efficiency and work quality may be expected to be improved, and a high demand is prospected in various industries where distributions, manufacturing, and maintenance are performed.

The HMD 10 is a terminal device which is mounted on the head of the user 11, displays information necessary for the user 11's work, and has a function of controlling information according to an operation of the user 11. The description in the embodiment will be given about a case where all the functions are installed in the HMD 10. However, some parts of the HMD 10 may be configured to be separated. For example, even in a case where some functions of the HMD 10 are installed in a portable communication terminal device such as a smart phone to perform main processes of the HMD 10, the obtained effects are similar to those of the embodiment described below.

Further, as illustrated in FIG. 1, in the following description, for convenience' sake, a width direction (a right and left direction of the user 11) of the HMD 10 is set to an x axis direction, a vertical direction is set to a y axis direction, and a front and back direction of the user 11 intersecting to both x and y axes is set to a z axis direction.

Figure 2:
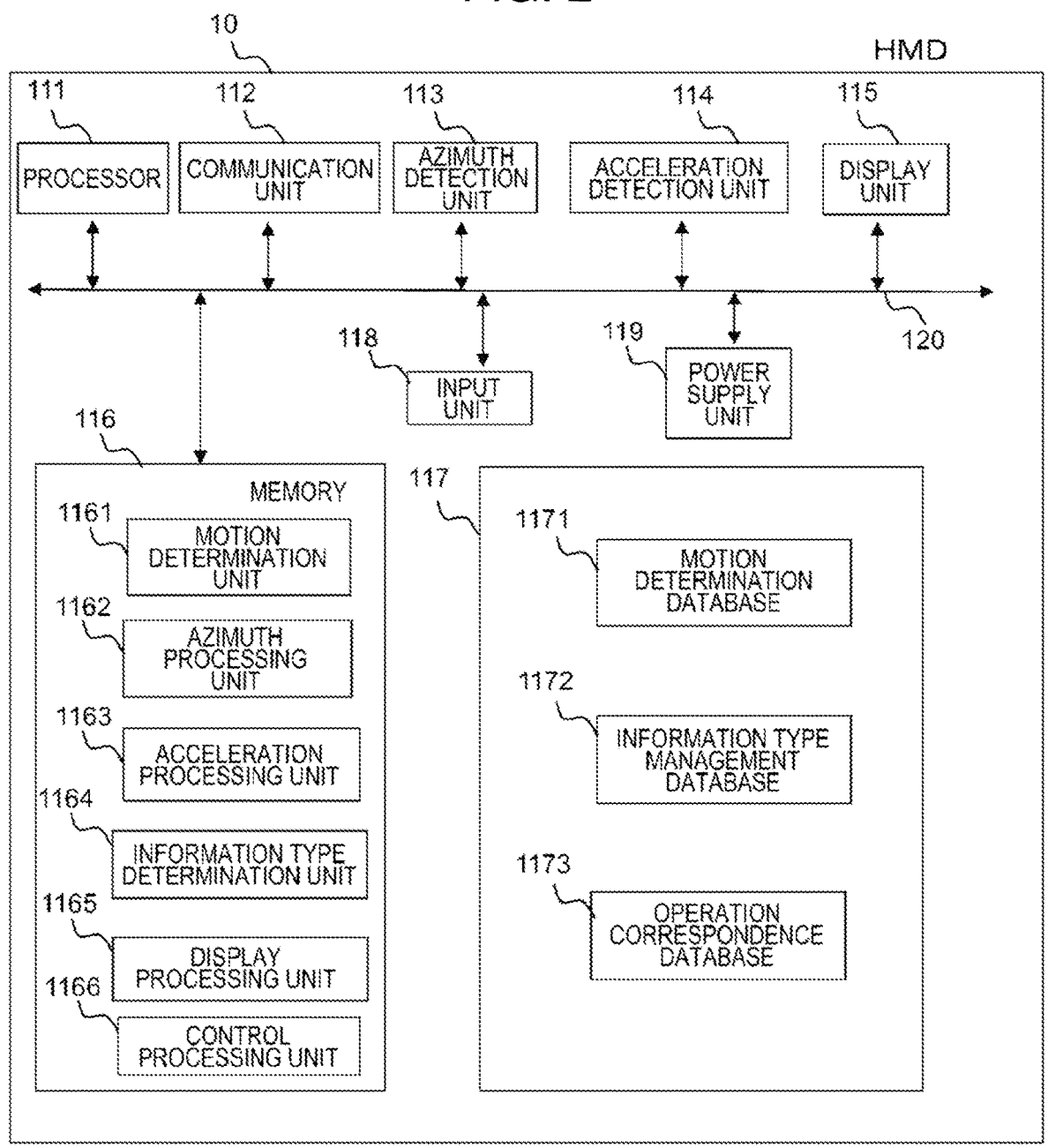
FIG. 2 is a diagram illustrating an example of a configuration of the terminal display device.

FIG. 2 is a diagram illustrating an example of a configuration of the HMD 10. The HMD 10 includes a processor 111, a communication unit 112, an azimuth detection unit 113, an acceleration detection unit 114, a display unit 115, a memory 116, a storage 117, an input unit 118, a power supply unit 119, and a bus 120. Further, the HMD 10 includes a motion determination unit 1161, an azimuth processing unit 1162, an acceleration processing unit 1163, an information type determination unit 1164, a display processing unit 1165, and a control processing unit 1166 in the memory 116. The control processing unit 1166 reads program modules corresponding to the processing units from the storage 117 and stores the program modules in the memory 116 for execution. The control processing unit 1166 performs the program modules to realize the processing of the embodiment. Further, the program modules may be stored in the storage 117 before the device related to the HMD 10 is shipped, or may be installed in the device related to the HMD 10 through an optical media such as a Compact Disk (CD), a Digital Versatile Disk (DVD), and a Blu-ray Disc (registered trademark) or a memory medium such as a semiconductor memory.

The processor 111 collectively represents a Central Processing Unit (CPU), a Micro Processing Unit (MPU), and a Digital Signal Processor (DSP), and has a function to perform a predetermined program.

The communication unit 112 includes a wireless communication function such as a wireless LAN, a Bluetooth (registered trademark), an infrared communication, an IC tag function, a TransferJET (registered trademark), a Long Term Evolution (LTE), a High Speed Packet Access (HSPA), an Evolution Data Only (EV-DO), and a WiMAX or a wired communication function such as an Ethernet (registered trademark), and transfers various types of information. The wireless communication function includes a desired antenna and a modem circuit. The wired communication function includes a desired connector and a modem circuit. The data may be transferred by appropriately switching a network communication through a network, a direct communication (for example, Bluetooth (registered trademark)) which is directly performed between various devices without a network, a wireless USB, a Felica (registered trademark), a ZigBee (registered trademark), a Z-WAVE (registered trademark), a visible light communication, an infrared communication, a Near Field Communication (NFC; registered trademark). The communication unit 112 may be configured to be compatible with a plurality of communication systems.

The azimuth detection unit 113 has a function of detecting rotation angles about the x, y, and z axes of the HMD 10 using a gyro sensor. Further, the azimuth detection unit 113 may be built in the HMD 10, or may be separately connected to the HMD 10 in a wireless or wired communication manner.

The acceleration detection unit 114 has a function of detecting an acceleration of the HMD 10 in the x, y, and z axes directions using an acceleration sensor. Further, the acceleration detection unit 114 may be built in the HMD 10, or may be separately connected to the HMD 10 in a wireless or wired communication manner.

The display unit 115 is constituted by a display panel such as a liquid crystal display, an organic Electro-Luminescence (EL) display, and an electronic paper, a light source, and a drive circuit, and displays any types of information (for example, characters, still images, and moving images) under the control of the control processing unit 1166. Further, the display unit 115 may have a plurality of display functions to display different pieces of information.

The memory 116 is formed of a Dynamic Random Access Memory (DRAM), and is controlled by an instruction of the control processing unit 1166. A functional unit of an application program stored in the storage 117 is read into the memory 116 for execution.

The storage 117 is configured with a recording medium built in the HMD 10, a detachable external recording medium, an optical disk, and the like, and has a function of memorizing various types of information. For example, the storage 117 is controlled by an instruction of the control processing unit 1166, and can store the application program. In addition, the storage 117 stores various types of information which is created by the application program. For example, the storage 117 stores a motion determination database 1171 which determines a motion pattern of the HMD 10 from a motion of the user 11, an information type management database 1172 (information type management memory unit) in which a display method is managed for respective types of information, and an operation correspondence database 1173 which associates the motion pattern and a display operation. The motion determination database 1171 and the operation correspondence database 1173 forma motion pattern memory unit which associates the motion pattern of the HMD 10 with an operation content with respect to an information object displayed by the display unit 115.

The input unit 118 including one or some of a keyboard, a mouse, a cursor key, and a ten key, has a function of receiving an operation of the user 11 and inputting an input signal based on the operation to the processor 111. Further, a microphone and a camera may be provided in the HMD 10 to generate an input signal by a speech recognition, an image recognition, or a gesture recognition, and input the input signal to the processor 111. Further, the input unit 118 may be integrally configured with the display unit 115 and the input unit 118 as a touch panel. In addition, the input unit 118 may also be installed in a place separated from the HMD 10 as a processing unit having the same function, and may be configured to input the input signal based on the operation to the processor 111 through a direct communication between devices. Further, the embodiment is configured to perform the display control of the HMD 10 in a handsfree manner without operating the input unit 118.

The power supply unit 119 is constituted by a battery, an AC adaptor, a charging circuit, and the like, and has a function of performing a power supply to each units of the HMD 10, and charging the battery. In addition, the power supply unit 119 checks a remaining power of the battery of the HMD 10. The bus 120 is a transmission path for the respective units of the HMD 10 to transfer a signal to each other.

Further, in the specification, a process performed by the processor 111 based on the program module stored in the memory 116 may be described as a process which is performed by the processing unit corresponding to the program module. For example, a process performed by the control processing unit 1166 is actually performed by the processor 111 according to the program module corresponding to the control processing unit 1166 which is stored in the memory 116. The other processing units also similarly are implemented.

Figure 3:
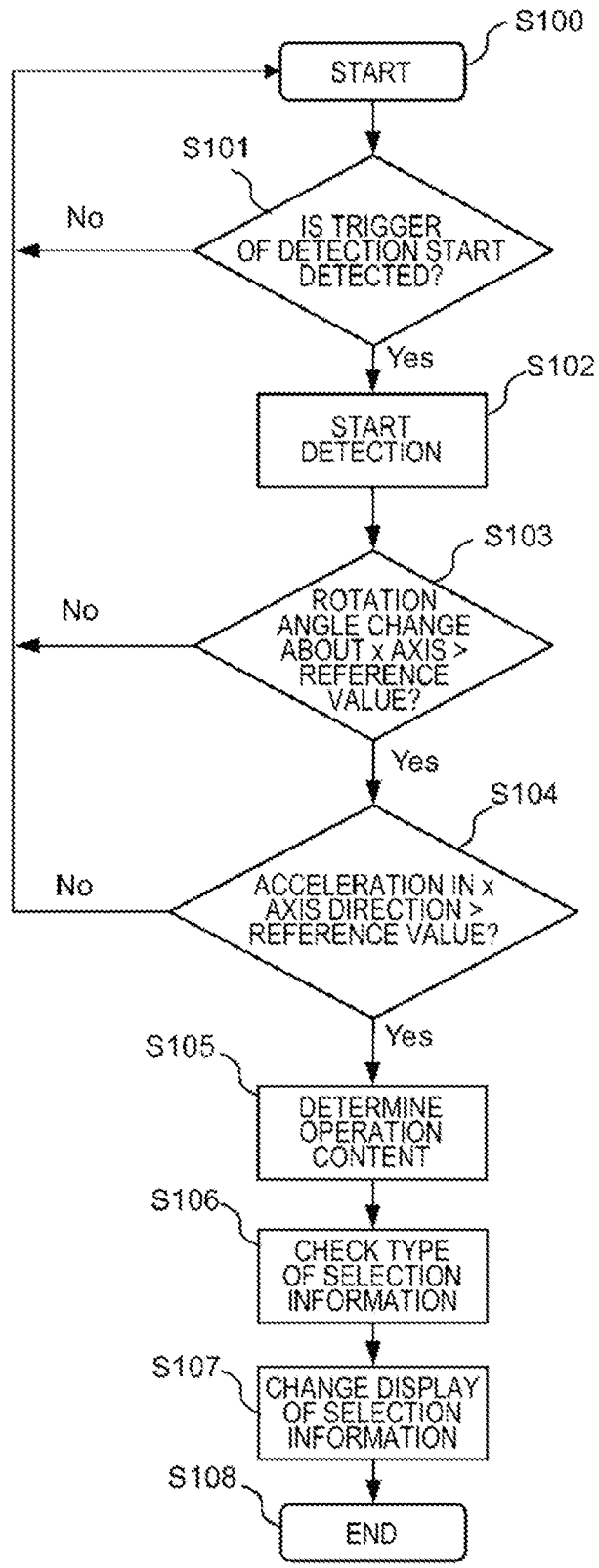
FIG. 3 is a flowchart illustrating an example of data processing in the terminal display device.

Next, the description will be given about the data processing which is performed by the HMD 10 of the embodiment configured as described above. In the description, the configuration of the database used in the data processing will also be described. FIG. 3 is an example of the process in which the HMD 10 determines an operation of the user from the acquired sensor data, and changes the display information based on the determined operation. In the HMD 10 of the embodiment, a display state of the image and the video displayed in the HMD 10 can be controlled according to a wagging motion of the head of the user 11 who wears the HMD.

Figure 4:
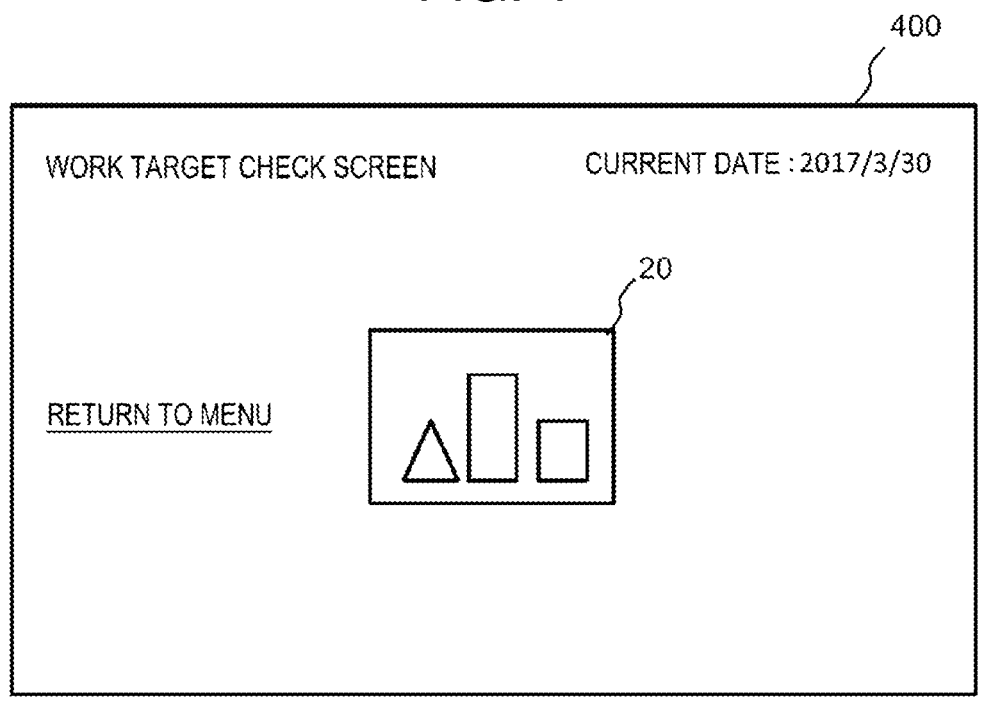
FIG. 4 is a diagram illustrating an example of information displayed in a display unit.
Figure 5:
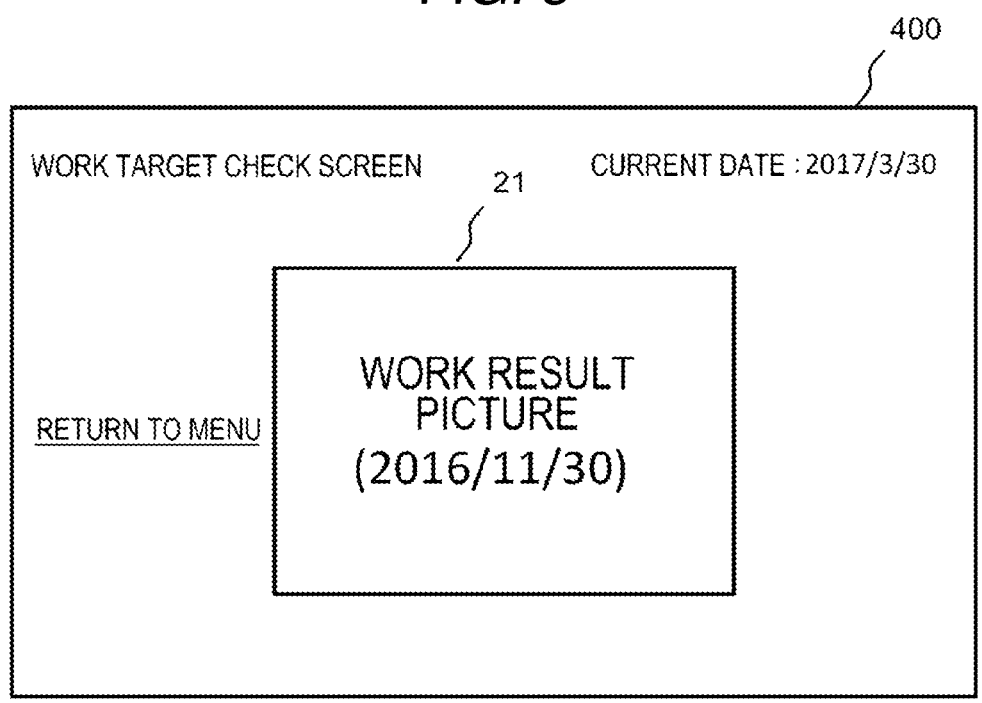
FIG. 5 is a diagram illustrating an example of a content displayed in the display unit.

In the HMD 10 of the embodiment, when the user wearing the HMD 10 moves the head, the detection values of the azimuth detection unit 113 and the acceleration detection unit 114 are changed. FIG. 4 illustrates an example of the information object which is displayed in the display unit 115 of the HMD 10. As illustrated in FIG. 4, in a display region 400 of the HMD 10, date information, a return button to a menu screen, and image information 20 are included. The image information 20 is an object which represents image data. In the following, the object is called an icon. The icon 20 that is the image information of FIG. 4 indicates that the image information is picture image data. FIG. 5 is an example of a content displayed in the display unit 115 when the icon 20 of FIG. 4 is selected and the icon 20 is changed to a picture image 21 through the motion of the HMD 10. There is needed a large amount of power by the HMD 10 in order to display high resolution image data such as the picture image data. Then, the corresponding icon 20 as illustrated in FIG. 4 is displayed in the HMD 10 of the embodiment if not otherwise issued an instruction from the user 11, so that the power saving is realized. Hereinafter, the embodiment will be described according to an example in which the information displayed in the display unit 115 of the HMD 10 is changed based on a change in value of the azimuth detection unit 113 and the acceleration detection unit 114.

When the HMD 10 is triggered at power-on, etc. to start the data processing of FIG. 3 (S100), the motion determination unit 1161 is on standby for the trigger of the motion detection start from the input unit 118 (S101, No). In a case where it is determined that the motion determination unit 1161 detects the trigger (S101, Yes), the detection processes of the azimuth processing unit 1162 and the acceleration processing unit 1163 are performed (S102).

The motion determination unit 1161 determines whether a change in the rotation angle about the x axial direction detected by the azimuth detection unit 113 exceeds a reference value through the azimuth processing unit 1162 (S103). The reference value may be any suitable value such as 50 degrees.

In a case where it is determined that the change in the rotation angle exceeds the reference value (S103, Yes), the motion determination unit 1161 determines whether an acceleration in the x axis direction detected by the acceleration detection unit 114 exceeds the reference value through the acceleration processing unit 1163 (S104). Similarly to the change in the rotation angle of S103, the reference value of the acceleration may be set to any suitable value such as 5.0 m/s$^2$. In a case where it is determined that the change exceeds the reference value (S104, Yes), the motion determination unit 1161 determines that the user wearing the HMD 10 performs a certain operation, and the procedure proceeds to the process of S105.

Further, in general, the output of various types of sensor containing a gyro sensor, an acceleration sensor, and an azimuth sensor fluctuates. Even when not operated, it is known that the sensors keep outputting random noises. Therefore, in order to cancel an influence of noise output, there may be considered to employ a unit determining whether the value of the sensor continuously exceeds the reference value by a predetermined number of times, a unit determining a difference between an average value of the predetermined number of times and the reference value, a unit using a movement average filter, and a unit using a finite impulse response filter of software. Any one of the above units may be applied to the sensor output. A hardware filter may be used in order to cancel the influence of the noise output. In addition, some of the plurality of units may be selected and combined. In the specification, a condition determination using various types of sensors is described on an assumption that a value after noise removal is used.

Herein, the motion determination database 1171 will be described. FIG. 6 illustrates an exemplary configuration of the motion determination database 1171. The motion determination database 1171 classifies and registers a possible motion of the user 11 into forward inclining, backward inclining which are motions of inclining the upper body, left turning, right turning which are motions shaking the head right and left, left inclining and right inclining which are motions of inclining the head right and left, and going forward, going backward, and stopping which are motions of moving front and rear. In addition, displacements of various motions are registered as types of "large" and "small", and motion speeds of various types of displacements are registered as types of "fast" and "slow".

In the motion determination database 1171 of the embodiment, slowness and fastness of the motion speed are associated to a magnitude of the displacement in the classification item of each motion, and 33 types of information including the stopping can be expressed. For example, Symbol C of the motion determination database 1171 indicates that the forward inclining is performed fast in a range smaller than the reference value. In a case where the changes in the values of the azimuth detection unit 113 and the acceleration detection unit 114 matched to the condition, it is determined that the motion corresponding to Symbol C is performed.

Returning to the data processing of the HMD 10, the motion determination unit 1161 extracts an item matched to the motion pattern which is most approximate to the data change of the azimuth detection unit 113 and the acceleration detection unit 114 caused by the operation of the user 11 with reference to the motion determination database 1171, and recognizes the operation corresponding to the item. For example, the operation "expand information" in which the image information 20 (icon) is expanded to the picture image 21 is determined to correspond to a case where Symbol Gg (that is, a stop posture) is detected after Symbol C of the motion determination database 1171 (that is, a posture of the forward inclining) is detected (S105). For example, the determination may be realized by providing an operation correspondence table 1173 together with the motion determination database 1171. FIG. 7 illustrates an exemplary configuration of the operation correspondence table 1173. The operation correspondence table 1173 stores the motion patterns (for example, Symbols C and Gg) and the operation content "magnify information" in correspondence with each other.

Returning to FIG. 3, after detecting the operation "magnify information", the information type determination unit 1164 identifies information disposed at the center of the current screen using the display content which is displayed in the display unit 115 (S106). An example of the display content is the same as described in FIGS. 4 and 5. Specifically, the information type determination unit 1164 extracts a data attribute such as a file name which corresponds to the information disposed at the center of the current screen.

FIG. 8 illustrates an example of the information type management database 1172. The information type management database 1172 manages items of an information object number 90, an information object name 91, an identification tag 92, an actual data name 93, a display icon filename 94, a display mode 95 at a long distance, and a display mode 96 at a close distance. For example, the icon 20 of FIG. 4 corresponds to the picture image 21 which shows a work result of FIG. 5. The information type determination unit 1164 compares the information identified in S106 with the information type management database 1172. In the example, a file name "Picture.jpg" is associated to the icon 20 in S106. Herein, in a case where Symbols C and Gg are specified in S105, the information type determination unit 1164 collates the information type management database 1172 to change the "Picture.jpg" icon to the picture image data, and displays the picture image data and ends the process (S107 and S108). The content displayed in the display unit 115 when the display is changed from the icon 20 to the image is illustrated in FIG. 5. The picture image 21 as a work result of FIG. 5 corresponds to the eleventh information object number 90 of FIG. 8, and shows "20170220_Device A Panel Inspection End Picture.jpg" of the actual data name 93.

As described above, according to the HMD 10 of the embodiment, the display content can be controlled by detecting the motion of the head of the user 11 who wears the HMD 10 without operating other devices with hands.

Further, the description has been given about a change of the display information in a case where the motion of "forward inclining" in which the body or the head is inclined forward. As another example, an operation "the user 11 selects an object displayed on the left side of the screen that the user watches" is considered. In a case where it is detected that Symbol K of the motion determination database 1171 illustrated in FIG. 6 (that is, a motion of fast turning the head to the left side) is performed, and Symbol Gg (that is, stopping posture) is performed, the motion is associated to the selection operation illustrated in FIG. 7. The motion determination unit 1161 checks whether a change of the rotation angle of the azimuth detection unit 113 about the z axis exceeds the reference value through the azimuth processing unit 1162 (S103). Thereafter, "forward inclining" and "left turning" can be distinguished in S104 and S105 as described above. In this way, the motion actually performed by a person is classified as illustrated in the motion determination database 1171, and the classified determination references are combined to recognize a motion with a high accuracy.

Further, the numerical values used for describing the processes of the embodiment have been given as merely an example, and the invention is not limited to the processing system which uses these numerical values. In addition, in the embodiment, "magnify" and "left select" have been described as an example of the motions registered in the motion determination database 1171. Otherwise, for example, Symbol W and Symbol Gg of FIG. 6 are associated to "right select", and the backward inclining which is a motion of inclining the upper body backward is performed two times (that is, Symbol E, Symbol Gg, and Symbol E are continuously detected two times) is associated to "an operation of canceling the last operation (Undo)", so that it is a matter of course that the other motion is assigned to the operation as illustrated in FIG. 7.

Second Embodiment

Next, a second embodiment of the invention will be described with reference to FIGS. 9 to 13.

In the first embodiment, the motion of the user 11 has been detected by the azimuth detection unit 113 and the acceleration detection unit 114 of the HMD 10, and the display information has been controlled based on the detected motion. In the embodiment, the description will be given about a configuration in which the image capturing element is provided in the HMD 10, and the information object in which the motion of the user is detected and displayed is controlled according to a change in captured information.

Figure 9:
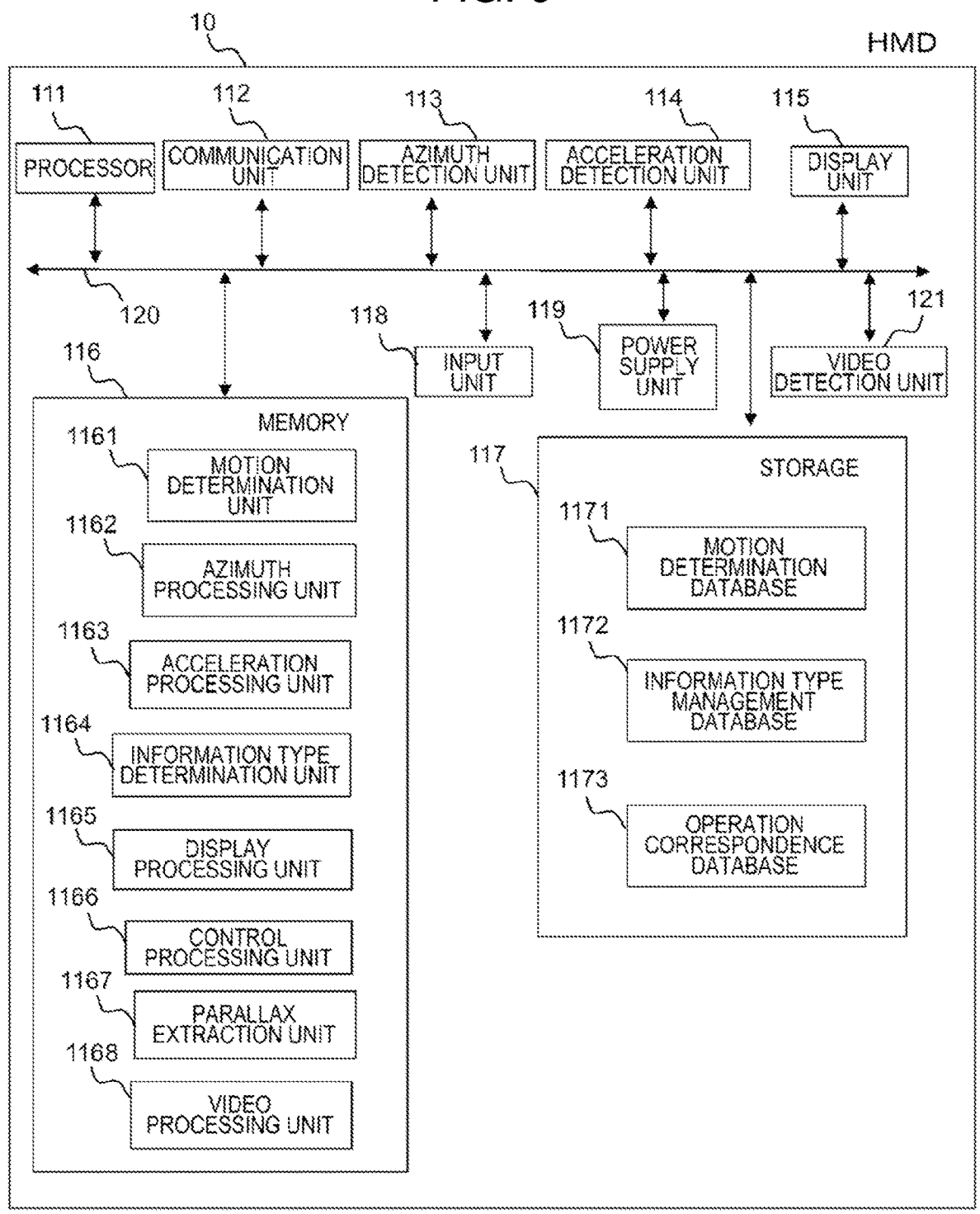
FIG. 9 is a diagram illustrating an exemplary configuration of the terminal display device according to a second embodiment of the invention.

FIG. 9 is a diagram illustrating an exemplary configuration of the HMD 10 in the embodiment. The description of the same configurations as those of the HMD 10 in the first embodiment will be omitted. The HMD 10 of the embodiment includes a video detection unit 121 in addition to the configuration of the HMD 10 of the first embodiment. The video detection unit 121 includes the image capturing element such as a Charge Coupled Device (CCD) element and a Complementary Metal Oxide Semiconductor (CMOS) element, and has a function of converting an incident light from a subject into electronic data. The video detection unit 121 may be built in the HMD 10, or may be realized using a portable terminal such as a smart phone and a portable telephone or a device having a camera function, and connected to the HMD 10 in a wireless or wired manner.

Figure 10:
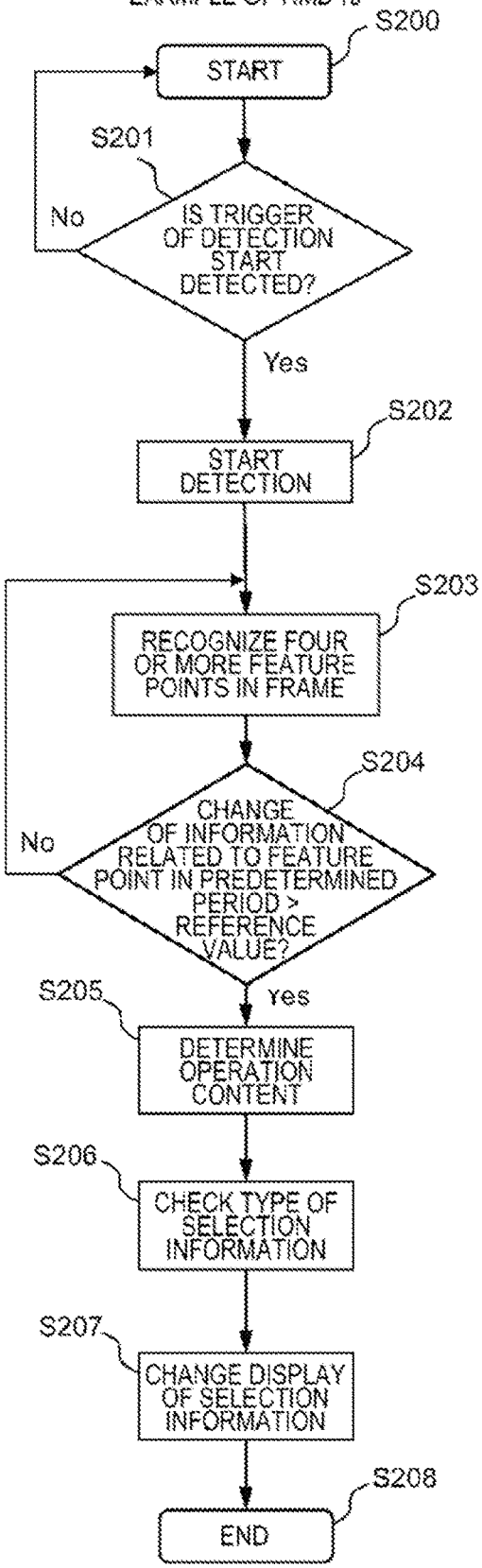
FIG. 10 is a flowchart illustrating an example of the data processing in the terminal display device according to the second embodiment.

FIG. 10 illustrates an example of the data processing of the HMD 10 of the embodiment in which a motion of the user 11 is detected based on the information from the video detection unit 121 so as to control the display information. In the example of a processing flow of FIG. 10, the processes of S200 to S202 are similar to those of S100 to S102 in the first embodiment, and the description will be omitted.

When the process starts to detect a motion of the user 11 in S202, a video processing unit 1168 activates a function of the video detection unit 121, and acquires the scenery in front of the HMD 10 as video data. At that time, the video processing unit 1168 recognizes four or more feature points contained in the video data for each time frame (S203). Further, the feature points may be three. In addition, the feature point may be extracted using a library for image analysis which is provided from OpenCV for example.

Figure 11:
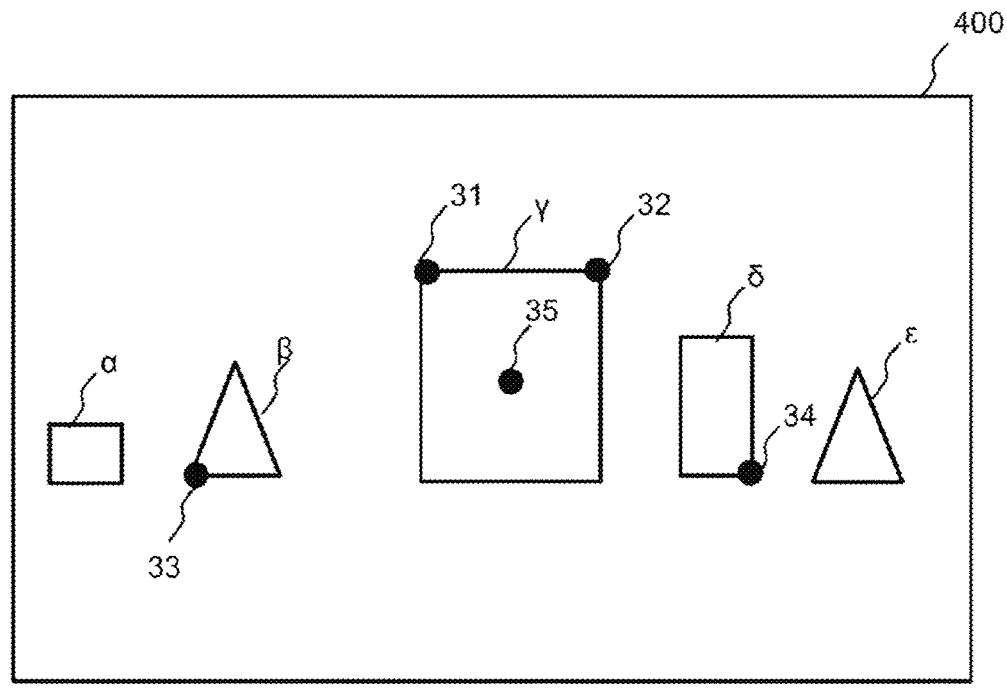
FIG. 11 is a diagram schematically illustrating feature point coordinates of a frame.

FIG. 11 illustrates an example of the video data which is captured by the video detection unit 121. In the example of FIG. 11, objects α, β, γ, δ, and ε are captured as subjects in front of the HMD 10. At this time, in a case where the feature points 31, 32, 33, and 34 in these objects are extracted as the feature points, the video processing unit 1168 stores the coordinates of the feature points 31, 32, 33, and 34, and a gravity center 35 on the coordinates of the feature points 31, 32, 33, and 34.

Figure 12:
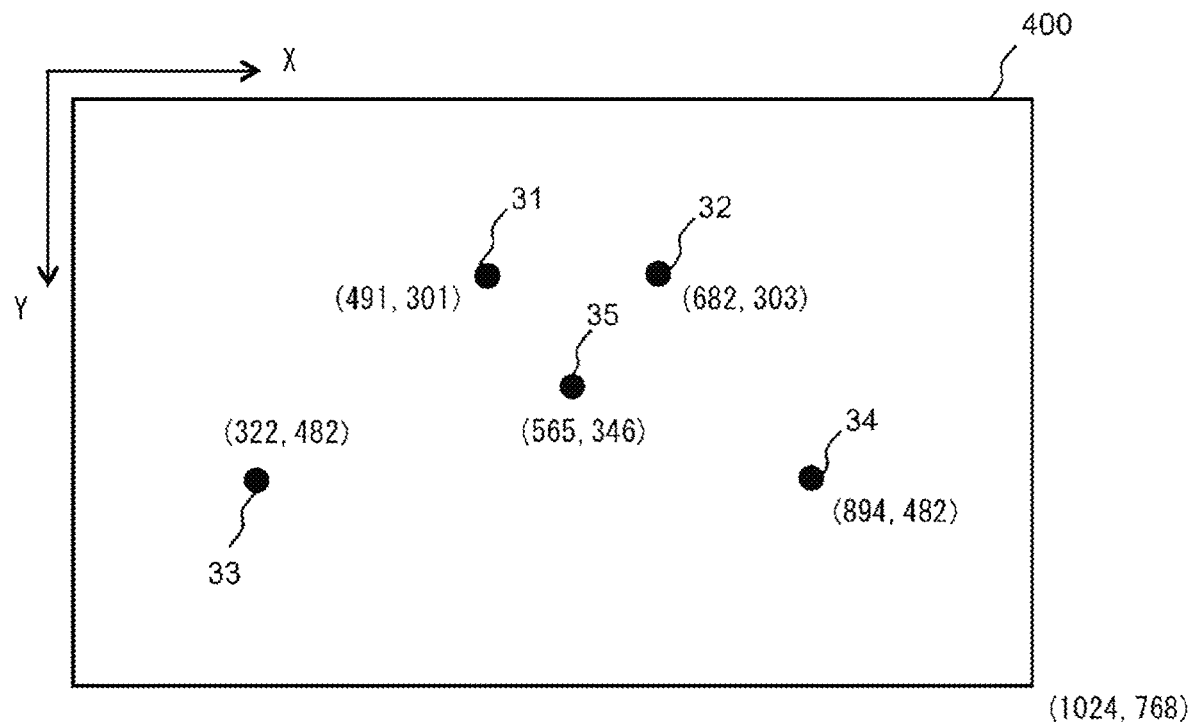
FIG. 12 is a diagram schematically illustrating feature point coordinates which are extracted from a frame.

Next, a parallax extraction unit 1167 checks the coordinates on the screen of the feature point which is recognized by the video processing unit 1168 for every time frame of the video. When the HMD 10 moves, the video acquired by the video detection unit 121 also moves. Therefore, the coordinates of the recognized feature point also changes. Herein, the coordinates may be defined with a resolution of the image which is acquired for each time frame as a reference by the video processing unit 1168. FIG. 12 illustrates an example of the feature point coordinates which is acquired in a certain video frame. Herein, the video resolution is set as 1024 pixels wide and 768 pixels long, but other resolutions may be set.

Figure 13:
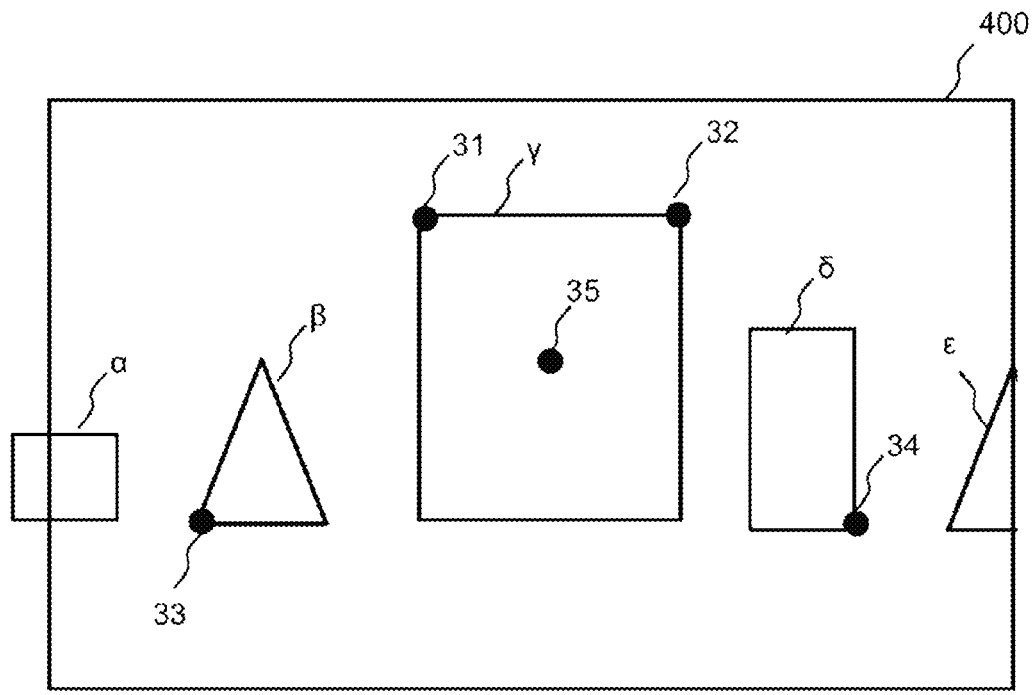
FIG. 13 is a diagram illustrating an example of video data when the terminal display device approaches an object γ in FIG. 11.

Returning to FIG. 10, in S204, it is determined whether information related to the feature point contained in the video (for example, the coordinates of the feature point and information of the area of a pattern formed by the feature points) is changed in a predetermined period of time. FIG. 13 illustrates an example of the video data captured by the video detection unit 121 when the HMD 10 approaches the object γ from the state illustrated in FIG. 11. In this case, the area of almost a trapezoidal shape formed by the feature points 31, 32, 33, and 34 of FIG. 13 becomes larger than the area of the corresponding portion in FIG. 11. In the embodiment, for example, it is determined that the corresponding area exceeds a predetermined reference value in a case where the area of the corresponding portions in the remaining four time frames is greater than the first three areas with reference to the area configured with the feature point coordinates identified by the first time frame among five acquired time frames (S204, Yes). In a case where a change of the information related to the feature points is equal to or less than the predetermined reference value (S204, No), the parallax extraction unit 1167 repeatedly determines whether there is the corresponding change.

Figure 14:
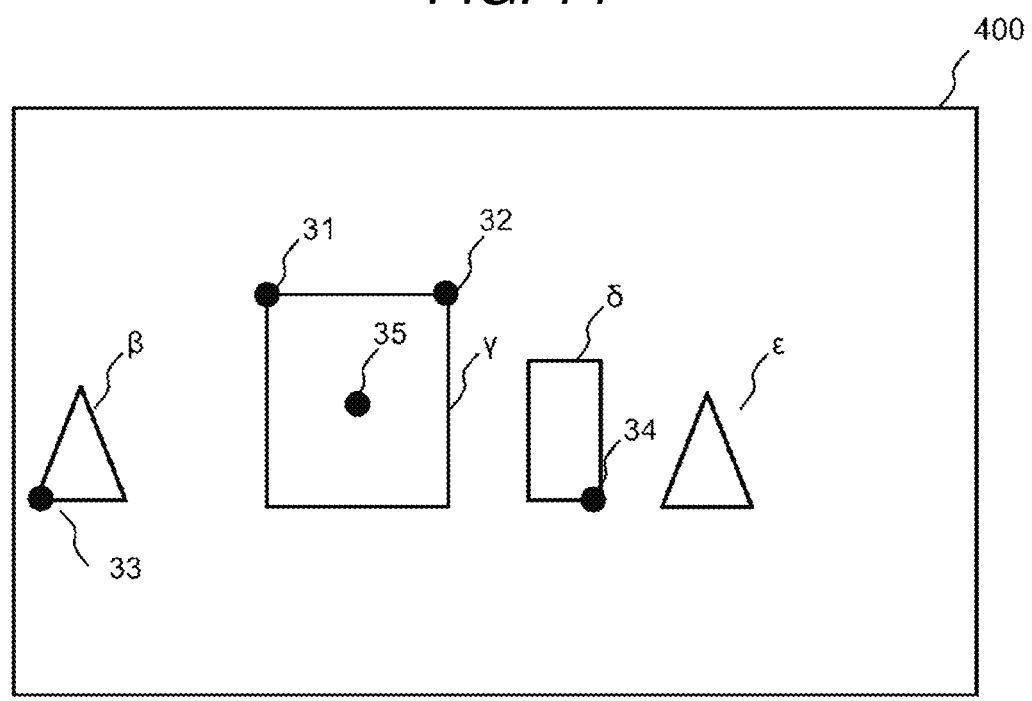
FIG. 14 is a diagram illustrating an example of the video data which is captured in FIG. 13.

As an example of detecting a motion other than the motion of approaching to the object γ, the description will be given about a case where the user 11 turns the head to the right direction. FIG. 14 is an example of the video data which is captured by the video detection unit 121 when the user 11 turns the head to the right side. In FIG. 13, the HMD 10 also moves to the right side when the head turns to the right side. At this time, in FIG. 14, the coordinates of the gravity center 35 of the feature points 31, 32, 33, and 34 is changed compared to FIG. 11. For example, in a case where, in the five acquired time frames, the coordinates of the gravity center 35 of the first recognized object is set as a reference, and the coordinates of the gravity center of three of the remaining four time frames are deviated to the left direction by 100 pixels or more, the parallax extraction unit 1167 determines that the change of the coordinates of the gravity center of the feature points exceeds the reference value (S204, Yes). As described in the example above, the change of the direction and the distance of the user 11 in the embodiment is acquired as an information change of the feature points in the acquired video instead of the output value of the sensors. The motion determination unit 1161 determines that a motion intended by the operation of the user 11 who wears the HMD 10 is performed in a case where the information change of the feature points exceeds the predetermined reference value. Therefore, in the embodiment, the respective items in the motion determination database 1171 may be defined based on the direction of the information change related to the feature points and a change rate of the magnitude.

Returning to the processing flow example of FIG. 10, the subsequent processes of S205 to S208 are respectively similar to those of S105 to S108 in FIG. 3 of the first embodiment, and thus the description will be omitted.

Further, the embodiment has been described about an example where the user 11 who wears the HMD 10 approaches the object, and the right-turn motion is assigned as an operation related to the display control. However, other motions such as turning left or inclining backward of the user 11 may also be similarly recognized and assigned as an operation.

As described above, according to the embodiment, the change of the motion of the HMD 10 is detected based on the video data and, as a result of the video analysis, it is possible to control the display information.

Third Embodiment

Next, a third embodiment of the invention will be described with reference to FIGS. 15 to 18. In the first and second embodiments, the description has been given about a system where the motion of the user 11 is assigned to the operation to control the display information by the process of the HMD 10. In the embodiment, the description will be given about a configuration that the process of detecting the motion of the user 11 and assigning the operation is performed on a network.

Figure 15:
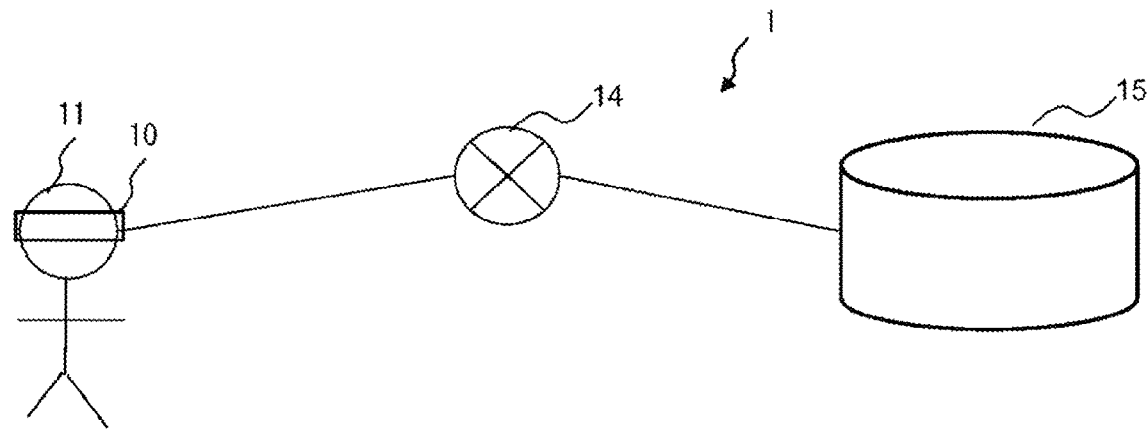
FIG. 15 is a diagram schematically illustrating a use state of the terminal display device according to a third embodiment of the invention.

FIG. 15 is an example of a system configuration in the embodiment. A display system 1 according to the embodiment includes the HMD 10, a communication network 14, and a management server 15.

The communication network 14 may be configured with the Internet, a local area network (LAN), an Universal Serial Bus (USB), a remote USB, a wireless LAN, a Bluetooth (registered trademark), an infrared communication, an IC tag function, a TransferJET (registered trademark), an LTE, a High Speed Packet Access (HSPA), or an Evolution Data Only (EV-DO). The HMD 10 and the management server 15 are configured to be connected to each other through the communication network 14.

The management server 15 is, for example, a server computer, and has a function of acquiring and analyzing detection data of the HMD 10 through the communication network 14 and returning a determination result to the HMD 10. Further, the embodiment will be described about a case where the HMD 10 and the management server 15 are provided in a one-to-one relation. However, the embodiment may also be applied to a configuration that the management server 15 is connected to a plurality of HMDs 10, and performs the process for each HMD 10. The management server 15 may be configured with one server computer. Alternatively, the management server 15 itself may be configured in a cloud environment on the communication network 14.

Figure 16:
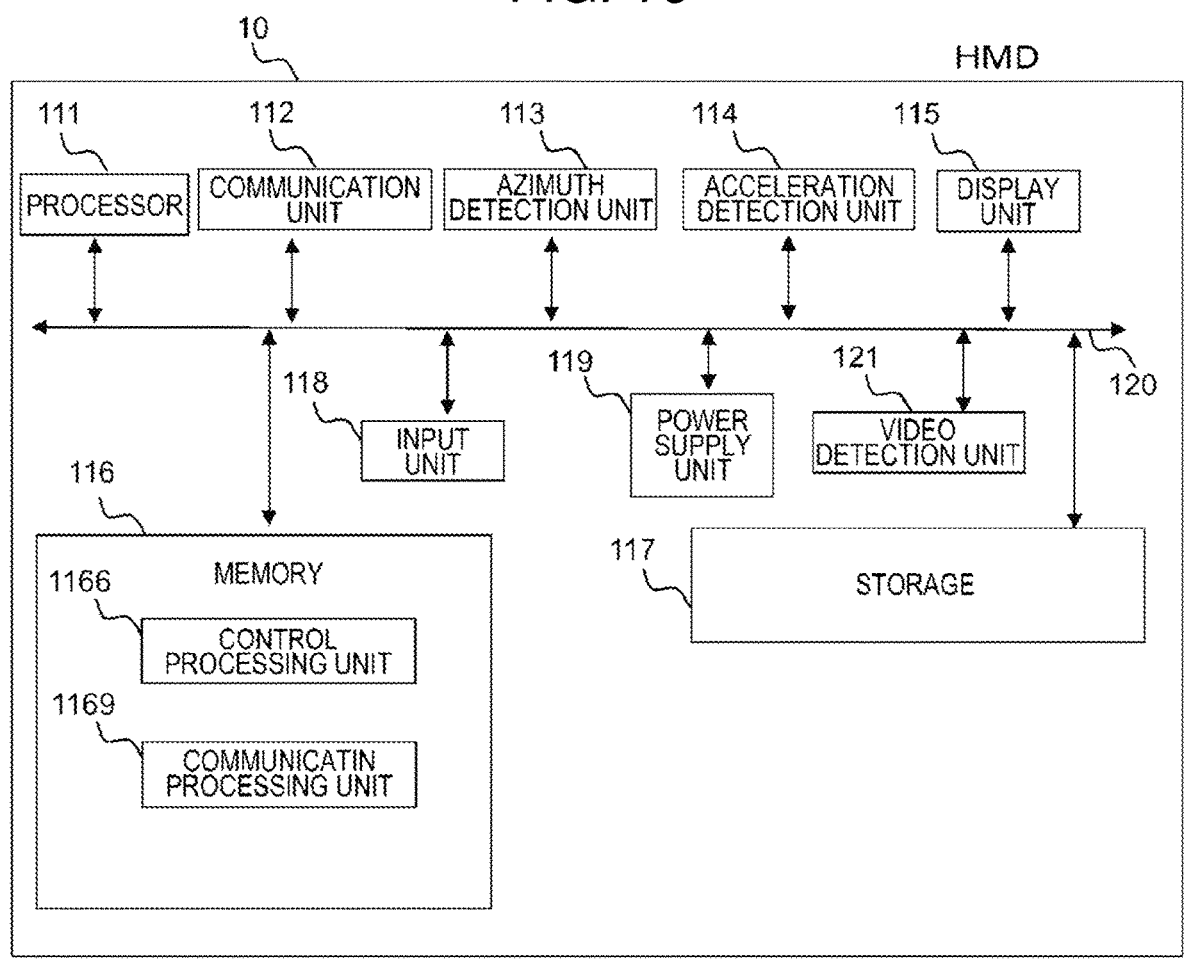
FIG. 16 is a diagram illustrating an exemplary configuration of the terminal display device.

FIG. 16 is a diagram illustrating an example of a configuration of the HMD 10 of the embodiment. The same configurations as those of the first and second embodiments illustrated in FIGS. 2 and 9 will be attached with the same symbol, and the description will be omitted. The HMD 10 of FIG. 16 includes the program modules of the display processing unit 1165, the control processing unit 1166, and a communication processing unit 1169, and other program modules are excluded from the memory 116. In addition, the storage 117 is not stored with a database. The communication processing unit 1169 has a function of controlling the communication unit 112 in order to perform the data transceiving process with the management server 15 through the communication network 14.

Figure 17:
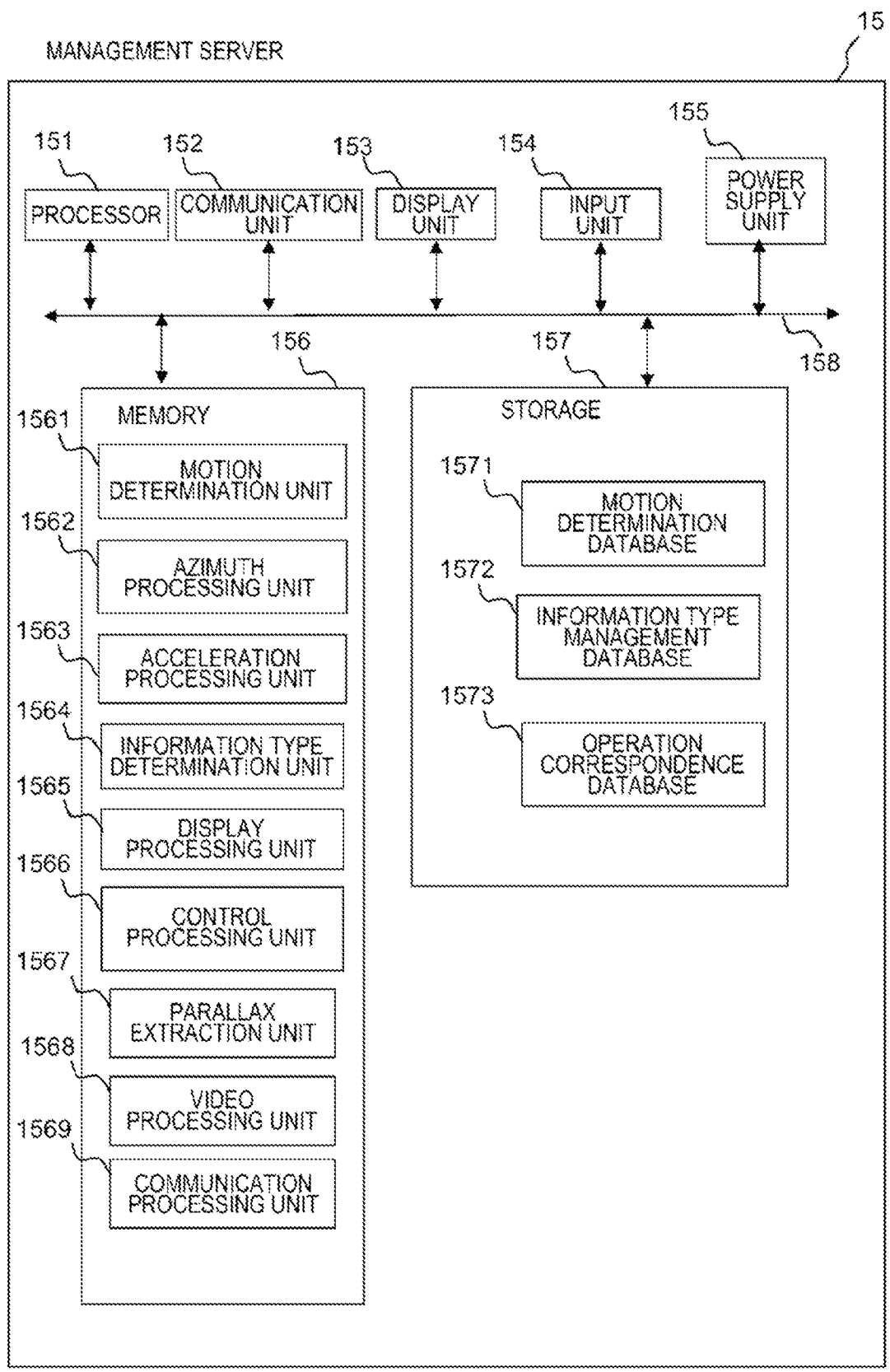
FIG. 17 is a diagram illustrating an exemplary configuration of a management server.

FIG. 17 is a diagram illustrating an example of a configuration of the management server 15. The management server 15 includes a processor 151, a communication unit 152, a display unit 153, an input unit 154, a power supply unit 155, a memory 156, a storage 157, and a bus 158, which correspond to the processor 111, the communication unit 112, the display unit 115, the input unit 118, the power supply unit 119, the memory 116, the storage 117, and the bus 120 in the HMD 10 of the first and second embodiments, and thus the description will be omitted.

In the memory 156 of the management server 15, the program modules of a motion determination unit 1561, an azimuth processing unit 1562, an acceleration processing unit 1563, an information type determination unit 1564, a display processing unit 1565, a control processing unit 1566, a parallax extraction unit 1567, a video processing unit 1568, and a communication processing unit 1569 are stored. The program modules other than the communication processing unit 1569 are similar to those corresponding to the HMD 10 in the first and second embodiments, and thus the description will be omitted. The communication processing unit 1569 includes a function of controlling the communication unit 152 in order to perform the data transceiving process with the HMD 10 through the communication network 14.

Further, as illustrated in FIGS. 16 and 17, in the embodiment, the HMD 10 includes the azimuth detection unit 113, the acceleration detection unit 114, and the video detection unit 121. The management server 15 includes the azimuth processing unit 1562, the acceleration processing unit 1563, the parallax extraction unit 1567, and the video processing unit 1568. The configuration may be changed to employ any one of a system where the motion of the HMD 10 is detected by a sensor, and a system where the video analysis is used.

Figure 18:
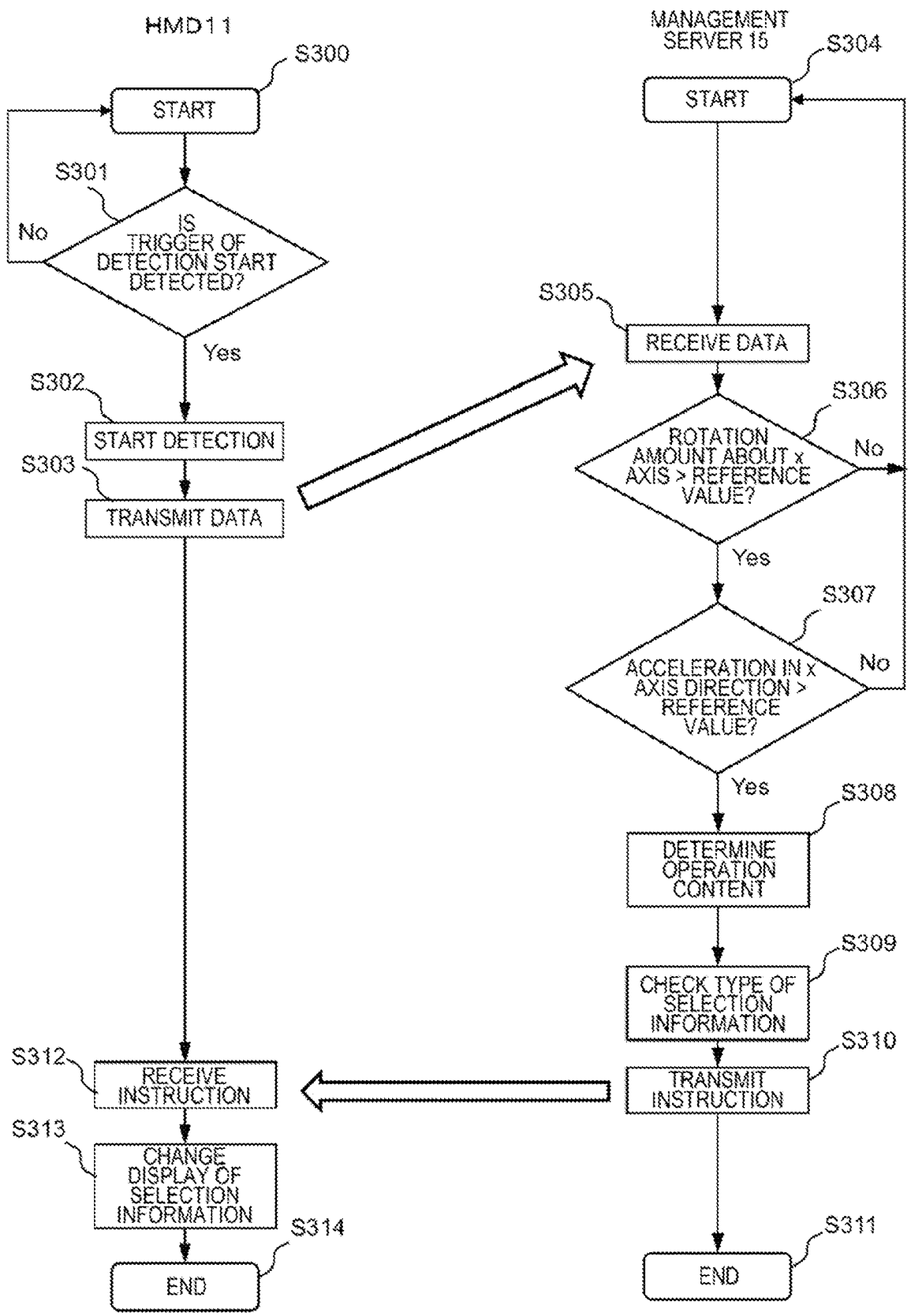
FIG. 18 is a sequence diagram illustrating an example of data processing in the terminal display device and the management server.

FIG. 18 illustrates an example of a process where the HMD 10 transmits the acquired data to the management server 15, the management server 15 analyzes the received data to determine a motion of the user 11 and transmits the determination result to the HMD 10, and the HMD 10 changes the display information based on the received determination result.

The HMD 10 and the management server 15 are triggered by an event such as power-on and start the process (S300, S304). In the HMD 10 which the user wears, the sensor data indicating the motion of the user 11 is acquired similarly to the processes of S101 and S102 in FIG. 3 of the first embodiment (S301, S302).

Next, the communication processing unit 1169 of the HMD 10 transmits the acquired data to the management server 15 (S303). The data acquired herein is, for example, numerical data acquired by the azimuth detection unit 113 and the acceleration detection unit 114 of the HMD 10 as illustrated in FIG. 2, or is video data acquired by a video detection unit 118. In a case where the management server 15 is configured to communicate with a plurality of HMDs 10, the data transmitted in S303 may be attached with ID data which uniquely indicates the sending source HMD.

The communication processing unit 1569 of the management server 15 receives the data from the HMD 10 (S305). Then, the management server 15 analyzes the data, determines the operation content, and checks the type of selection information similarly to the processes of S103 to S106 illustrated in FIG. 3 of the first embodiment (S306 to S309). Further, in a case where the video data described in the second embodiment is received from the HMD 10, the processes of S306 to S307 of the embodiment are replaced with the processes of S203 to S205 of FIG. 10. The information of the operation content and the selection information type specified by the management server 15 are transmitted to the HMD 10 (S310).

The HMD 10 receives an instruction which contains the operation content and the selection information type received from the management server 15 (S312). The display processing unit 1165 updates the displayed selection information according to the instruction and ends the process (S313, S314).

As described above, according to the embodiment, it is possible to control the display information of the HMD 10 by analyzing the change of the motion of the HMD 10 in the management server 15. In addition, the data processing is not performed by the HMD 10 in order to analyze the change of the motion of the HMD 10. Therefore, the configuration of the HMD 10 is simplified, and the manufacturing cost can be lowered. In addition, it is possible to realize low power consumption in the HMD 10.

Although the present disclosure has been described with reference to example embodiments, those skilled in the art will recognize that various changes and modifications may be made in form and detail without departing from the spirit and scope of the claimed subject matter.

What is claimed is:

1. A display system, comprising:
a terminal display device which a user wears on a user's head,
the terminal display device including:
a display panel,
a motion detection sensor which moves with the terminal display device and detects motion of the terminal display device,
a memory which stores motion determination information and operation correspondence information, and
a processor coupled to the display panel, the motion detection sensor, and the memory,
wherein the motion determination information is classified into a plurality of different predetermined motions detected by the motion detection sensor, and each of the predetermined motions is defined by a combination of a respective motion type, a respective displacement amount of motion relative to a first reference value which is greater than zero, and a respective movement speed of motion relative to a second reference value,
wherein the stored operation correspondence information includes a plurality of different motion patterns that each correspond with a different one of a plurality of operation contents,
wherein each of the motion patterns is a sequence of two or more of the predetermined motions of the motion determination information,
wherein the memory further stores instructions that, when executed by the processor, cause the processor to:
display, on the display panel, one or more information objects to overlap with a field of view of the user;
determine one operation content, of the plurality of operation contents, of the terminal display device based on a sequence of at least a first predetermined motion and a second predetermined motion of the terminal display device detected by the motion detection sensor based on the motion determination information and based on the correspondence between one of the motion patterns which includes the sequence of the at least first predetermined motion and the second predetermined motion and one of the operation contents stored in the operation correspondence information,
specify an information object disposed at a predetermined position of the display panel from among the one or more information objects, and
perform an operation on the specified information object displayed on the display panel according to the determined one operation content.

2. The display system according to claim 1, wherein the motion detection sensor includes:
a gyro sensor which detects an azimuth change of the terminal display device, and
an acceleration sensor which detects an acceleration change of the terminal display device.

3. The display system according to claim 1, wherein the memory further stores instructions that, when executed by the processor, cause the processor to:
acquire a plurality of pieces of video information over time displayed by the display panel, and
recognize at least one feature point of the information object which is contained in each of the pieces of the video information, and determine one of the motion patterns which corresponds to the sequence of the at least first and second predetermined motions when a change of a positional relation of the at least one feature point is greater than a predetermined reference value.

4. The display system according to claim 1, wherein the determined operation content is selecting the information object serving as an operation target among plural information objects displayed by the display panel.

5. The display system according to claim 1, wherein the determined operation content is changing the display of the information object between a lower resolution and a higher resolution.

6. A display system, comprising:
a terminal display device which a user wears on a user's head; and
a management computer which is connected to communicate with the terminal display device,
the terminal display device including:
a display panel, and
a motion detection sensor which moves with the terminal display device and detects motion of the terminal display device,
the management computer including:
a first memory which stores motion determination information and operation correspondence information, and
a first processor coupled to the first memory,
wherein the motion determination information is classified into a plurality of different predetermined motions, detected by the motion detection sensor and each of the predetermined motions is defined by a combination of a respective motion type, a respective displacement amount of motion relative to a first reference value which is greater than zero, and a respective movement speed of motion relative to a second reference value,
wherein the stored operation correspondence information includes a plurality of different motion patterns that each correspond with a different one of a plurality of operation contents,
wherein each of the motion patterns is a sequence of two or more of the predetermined motions of the motion determination information,
wherein the information type management information stores information related to a display mode of the information object,
wherein the first memory further stores instructions that, when executed by the first processor, cause the first processor to:
display, on the display panel, one or more information objects to overlap with a field of view of the user;
determine one operation content, of the plurality of operation contents, of the terminal display device based on a sequence of at least a first predetermined motion and a second predetermined motion of the terminal display device detected by the motion detection sensor based on the motion determination information and based on the correspondence between one of the motion patterns which includes the sequence of the at least the first predetermined motion and the second predetermined motion and one of the operation contents stored in the operation correspondence information,
specify an information object disposed at a predetermined position of the display panel from among the one or more information objects, and
transmit operation instruction information containing information which is related to the determined operation content and the specified information object to the terminal display device, and the terminal display device further including:

a second processor, and a second memory stores instructions that, when executed by the second processor, cause the second processor to:

perform an operation on the specified information object displayed on the display panel based on the operation instruction information.

7. The display system according to claim 6, wherein the motion detection sensor includes:

a gyro sensor which detects an azimuth change of the terminal display device, and an acceleration sensor which detects an acceleration change of the terminal display device.

8. The display system according to claim 6, wherein the first memory further stores instructions that, when executed by the first processor, cause the first processor to:

acquire a plurality of pieces of video information over time displayed by the display panel, and recognize at least one feature point of the information object which is contained in each of the pieces of the video information, and determine one of the motion patterns which corresponds to the sequence of the at least first and second predetermined motions when a change of a positional relation of the at least one feature point is greater than a predetermined reference value.

9. The display system according to claim 6, wherein the determined operation content is selecting the information object serving as an operation target among plural information objects displayed by the display panel.

10. The display system according to claim 6, wherein the operation content is changing the display of the information object from a lower resolution to a higher resolution.

11. A display control method of a terminal display device which a user wears on a user's head, the method comprising:

displaying one or more information objects to overlap with a field of view of the user on a display panel of the terminal display device;

detecting motion of the terminal display device with a motion detection sensor which moves with the terminal display device;

storing motion determination information classified into a plurality of different predetermined motions detected by the motion detection sensor, each of the predetermined motions being defined by a combination of a respective motion type, a respective displacement amount of motion relative to a first reference value which is greater than zero, and a respective movement speed of motion relative to a second reference value, and storing operation correspondence information which includes a plurality of different motion patterns that each correspond with a different one of a plurality of operation contents, each of the motion patterns is a respective sequence of two or more of the predetermined motions of the motion determination information;

determining one operation content, of the plurality of operation contents, of the terminal display device based on a sequence of at least a first predetermined motion and a second predetermined motion of the terminal display device detected by the motion section sensor based on the motion determination information and based on the correspondence between one of the motion patterns which includes the sequence of the at least the first predetermined motion and the second predetermined motion and one of the operation contents stored in the operation correspondence information;

specifying an information object disposed at a predetermined position of the display panel from among the one or more information objects; and performing an operation on the specified information object displayed on the display panel according to the determined operation content.

12. The display control method of the terminal display device according to claim 11, wherein the motion detecting includes detecting an azimuth change of the terminal display device, and an acceleration change of the terminal display device.

13. The display control method of the terminal display device according to claim 11, further comprising:

acquiring a plurality of pieces of video information displayed over time by the display panel, and recognizing at least one feature point of the information object which is contained in each of the pieces of the video information, and determining one of the motion patterns which corresponds to the sequence of the at least first and second predetermined motions when a change of a positional relation of the at least one feature point is greater than a predetermined reference value.

14. The display control method of the terminal display device according to claim 11, wherein the determined operation content is selecting the information object serving as an operation target among plural information objects displayed by the display panel.

15. The display control method of the terminal display device according to claim 11, wherein the operation content is changing the display of the information object between a lower resolution and a higher resolution.

* * * * *